United States Patent
Greenberg

(10) Patent No.: US 8,644,861 B1
(45) Date of Patent: Feb. 4, 2014

(54) EFFICIENT ACQUISITION OF SYSTEM INFORMATION IN MOBILE COMMUNICATION TERMINALS

(75) Inventor: Vitaly Greenberg, Petach Tikva (IL)

(73) Assignee: Marvell International Ltd., Hamilton (BM)

( * ) Notice: Subject to any disclaimer, the term of this patent is extended or adjusted under 35 U.S.C. 154(b) by 345 days.

(21) Appl. No.: 12/883,208

(22) Filed: Sep. 16, 2010

Related U.S. Application Data

(60) Provisional application No. 61/245,243, filed on Sep. 23, 2009.

(51) Int. Cl.
*H04W 4/00* (2009.01)
*H04W 68/00* (2009.01)

(52) U.S. Cl.
USPC .................. 455/458; 455/426.1; 455/466

(58) Field of Classification Search
USPC ............. 455/63.1, 67.11, 418–428, 434, 458, 455/466, 502–504, 515, 524–526, 550.1, 455/556.2, 561; 370/312–313, 349, 395.21, 370/432, 471, 473; 714/47.1–47.2, 48, 714/746–752, 798–799
See application file for complete search history.

(56) References Cited

U.S. PATENT DOCUMENTS

| | | | |
|---|---|---|---|
| 7,047,050 B1 * | 5/2006 | Khawand et al. ............. | 455/574 |
| 7,386,030 B2 * | 6/2008 | Asghar et al. ................ | 375/142 |
| 2005/0195852 A1 * | 9/2005 | Vayanos et al. ............... | 370/437 |
| 2009/0181661 A1 * | 7/2009 | Kitazoe et al. ................ | 455/418 |
| 2009/0253422 A1 * | 10/2009 | Fischer ......................... | 455/418 |
| 2009/0310503 A1 * | 12/2009 | Tenny et al. .................. | 370/252 |
| 2009/0316603 A1 * | 12/2009 | Amerga et al. ............... | 370/254 |

OTHER PUBLICATIONS

3GPP TS 25.331 V8.7.0, (Jun. 2009).*
3GPP TS36.300, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", version 8.12.0, Sophia Antipolis, France, Mar. 2010.
3GPP TS36.331, "Technical Specification Group Radio Access Network; Evolved Universal Terrestrial Radio Access (E-UTRA) Radio Resource Control (RRC); Protocol specification (Release 8)", version 8.6.0, section 5.2, Sophia Antipolis, France, Jun. 2009.
3GPP TS36.304, "Technical Specification Group Radio Access Network; Evolved Universal Terrestrial Radio Access (E-UTRA); User Equipment (UE) procedures in idle mode (Release 8)", version 8.8.0, Sophia Antipolis, France, Dec. 2009.

* cited by examiner

Primary Examiner — Meless Zewdu

(57) ABSTRACT

A method includes attempting to receive at a mobile communication terminal paging messages, which are transmitted from a base station. A likelihood that the mobile communication terminal has missed one or more of the paging messages is estimated. In response to finding that the estimated likelihood exceeds a likelihood threshold, an ascertainment is made at the mobile communication terminal whether at least one parameter of operation of the base station has changed by decoding at least part of a downlink message, other than the paging messages, that is transmitted by the base station.

19 Claims, 3 Drawing Sheets

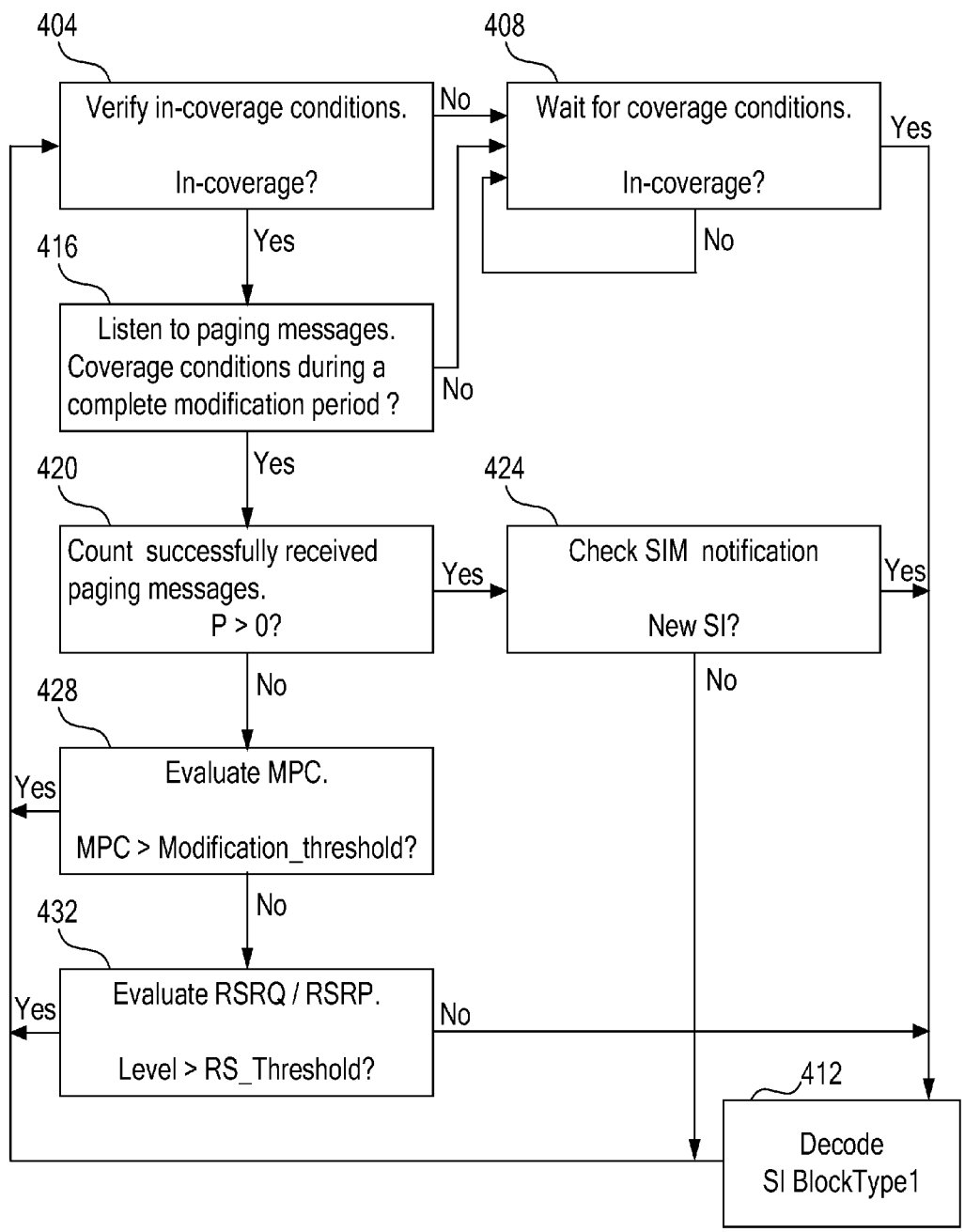

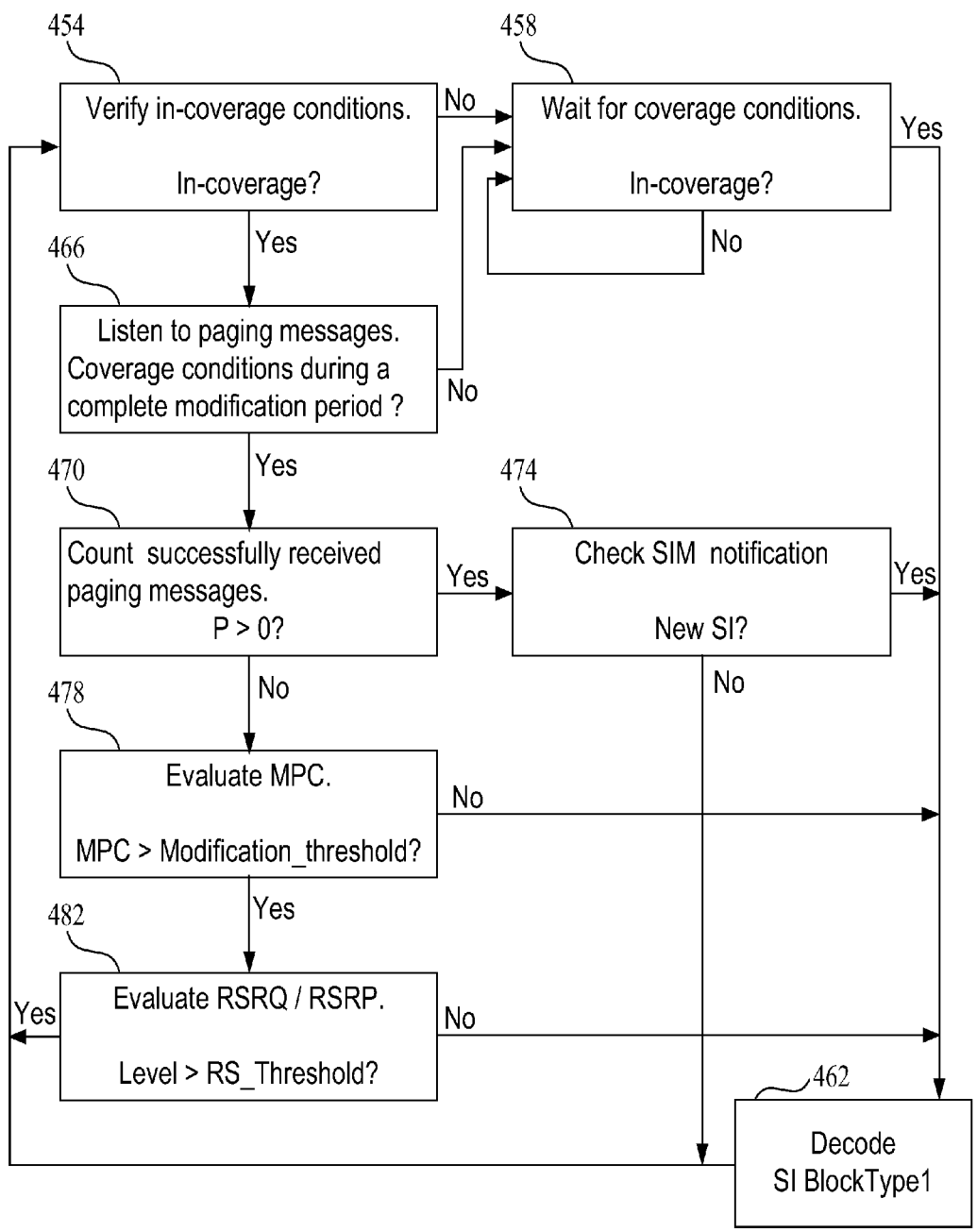

EFFICIENT ACQUISITION OF SYSTEM INFORMATION IN MOBILE COMMUNICATION TERMINALS

CROSS-REFERENCE TO RELATED APPLICATIONS

This application claims the benefit of U.S. Provisional Patent Application 61/245,243, filed Sep. 23, 2009, whose disclosure is incorporated herein by reference.

FIELD OF THE DISCLOSURE

The present disclosure relates generally to communication networks, and particularly to acquisition of system parameters by user terminals in wireless communication networks.

BACKGROUND

Operation of User Equipment (UE) in cellular communication networks, such as Evolved Universal Terrestrial Radio Access (E-UTRA) networks (also referred to as Long Term Evolution—LTE), requires the knowledge of cell-specific System Information (SI) parameters that the network broadcasts to the UEs in each cell over Broadcast Channel messages. Signaling of SI to LTE UEs is specified by the $3^{rd}$ Generation Partnership Project (3GPP) in "Technical Specification Group Radio Access Network; Evolved Universal Terrestrial Radio Access (E-UTRA) Radio Resource Control (RRC); Protocol specification (Release 8)," TS 36.331, version 8.6.0, June, 2009, section 5.2, and in "Technical Specification Group Radio Access Network; Evolved Universal Terrestrial Radio Access (E-UTRA); User Equipment (UE) procedures in idle mode (Release 8)," TS 36.304, version 8.8.0, December, 2009, which are incorporated herein by reference.

The background description provided herein is presented as a general overview of related art in this field and should not be construed as an admission that any of the information it contains constitutes prior art against the present patent application.

SUMMARY

An embodiment that is described herein provides a method, which includes attempting to receive at a mobile communication terminal paging messages that are transmitted from a base station. A likelihood that the mobile communication terminal has missed one or more of the paging messages is estimated. In response to finding that the estimated likelihood exceeds a likelihood threshold, an ascertainment is made at the mobile communication terminal whether at least one parameter of operation of the base station has changed by decoding at least part of a downlink message, other than the paging messages, that is transmitted by the base station.

In some embodiments, decoding the downlink message includes extracting from the downlink message System Information (SI) including the parameter of operation. In an embodiment, attempting to receive the paging messages includes attempting to extract from the paging messages respective indications that indicate whether the parameter of operation has changed. In a disclosed embodiment, the method includes extracting an updated value of the parameter of operation from the downlink message when the downlink message indicates that the parameter of operation has changed.

In another embodiment, changes in the parameter of operation are permitted at boundaries of predefined modification periods such that the parameter of operation is constant during each of the modification periods, and estimating the likelihood includes evaluating a criterion that depends on a preconfigured number of the paging messages that are transmitted in each of the modification periods. In yet another embodiment, the method includes refraining from estimating the likelihood upon evaluating a criterion that depends on a number of previous paging messages that were received successfully.

In an embodiment, estimating the likelihood includes estimating a measure of quality at which transmissions of the base station are received at the mobile communication terminal, and assessing the likelihood based on the measure of quality. In another embodiment, attempting to receive the paging messages and decoding the downlink message include receiving Long Term Evolution (LTE) signals from the base station.

There is additionally provided, in accordance with an embodiment that is described herein, apparatus including a receiver, a paging decoding module and a change detection module. The receiver is configured to receive signals from a base station. The paging decoding module is configured to attempt to decode, using the received signals, paging messages that are transmitted from the base station. The change detection module is configured to estimate a likelihood that one or more of the paging messages have been missed, and, responsively to finding that the estimated likelihood exceeds a likelihood threshold, to ascertain whether at least one parameter of operation of the base station has changed by decoding at least part of a downlink message, other than the paging messages, that is transmitted by the base station. In an embodiment, the paging decoding module and the change detection module are included in a single processor. In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

BRIEF DESCRIPTION OF THE DRAWINGS

FIGS. 4A and 4B are flow charts that schematically illustrate methods for detecting System Information change, in accordance with embodiments of the present disclosure.

DETAILED DESCRIPTION OF EMBODIMENTS

Figure 1:
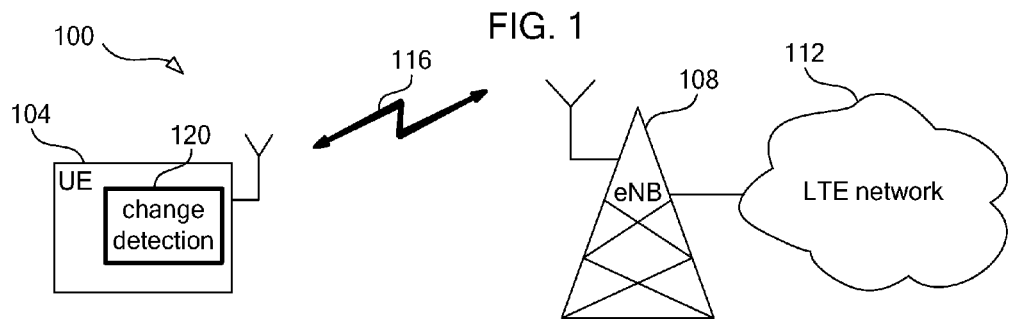
FIG. 1 is a block diagram that schematically illustrates a wireless network, in accordance with an embodiment of the present disclosure.

| ABBREVIATION TABLE | |
|---|---|
| BCCH | Broadcast Control Channel |
| eNB | Evolved NodeB |

-continued

ABBREVIATION TABLE

| | |
|---|---|
| LTE | Long Term Evolution |
| MP | Modification Period |
| MPC | Modification Period Coefficient |
| RSRP | Reference Signal Received Power |
| RSRQ | Reference Signal Received Quality |
| SI | System Information |
| SIM | System Information Modification |
| UE | User Equipment |
| VT | Value Tag |

The present disclosure provides improved methods and devices for providing mobile communication terminals in wireless communication networks, such as Long Term Evolution (LTE) networks, with updated operating parameters. A base station, which is denoted eNB in the LTE network, broadcasts to mobile terminals, which are denoted as User Equipments (UEs), parameters of operation that the UEs shall use when operating in the eNB cell. The eNB broadcasts the operating parameters within System Information (SI) messages, which are part of a downlink Broadcast Channel (BCCH) that the eNB transmits within the cell.

A SI BlockType1 message includes a Value Tag (VT) information element that specifies the SI version. Upon resumption of coverage conditions, for example, the UE typically decodes the BlockType1, extracts the VT thereof and compares it with the VT of the SI version that is currently used by the UE. A mismatch between the extracted and the currently-used VT indicates to the UE that at least one parameter of operation has changed. Consequently, the UE would download and extract the new SI from the BCCH in order to acquire updated parameters of operation.

The eNB transmits the SI in periods denoted as Modification Periods (MPs), such that the SI is held constant during each MP and a new SI would come into effect only at the beginning of a new MP. During the MP that precedes the change (modification) in SI, the eNB transmits System Information Modification (SIM) notifications as part of paging messages that it broadcasts to the UEs in the cell. The minimal number of SIM notifications that the eNB transmits in the MP that precedes the new SI is typically a preconfigured number, denoted as Modification Period Coefficient (MPC). This implies that if the eNB does not need to broadcast paging messages for any other purpose, e.g., for incoming call notification, it will nevertheless broadcast MPC paging messages in each MP, comprising SIM notification if relevant. Hence, in non busy cells, wherein paging reception is rare, the MPC typically corresponds to the maximal number of SIM notifications that the UE will receive.

In some scenarios, a UE that is within coverage of a certain cell misses the paging messages during a given MP. Paging messages may be missed, for example, because of fading, failure to decode the paging message Cyclic Redundancy Check (CRC), or for any other reason. When the UE does not receive paging messages during a given MP, however, it cannot determine whether the eNB did not broadcast paging messages (meaning that the SI version did not change) or whether the paging messages were missed. A potential consequence of missing paging messages that indicate a change of SI is that the UE may become unreachable for up to several hours. Although it is possible in principle for the UE to download the BCCH BlockType1 whenever the UE does not receive paging messages during a given MP, this technique unnecessarily increases the UE power consumption.

In some embodiments of the present disclosure, the UE comprises a mechanism, which obviates the need to download the BCCH BlockType1 after each MP in which no paging messages have been received. The mechanism is based on estimating a likelihood that the UE has missed all the paging messages during a MP while being in eNB coverage conditions. In these embodiments, even if the UE receives no paging messages during a given MP, the UE will refrain from downloading the BCCH BlockType1 if the estimated likelihood is sufficiently low. In some embodiments, the estimated likelihood is deemed sufficiently low if the MPC is sufficiently high and/or if a Reference Signal Received Quality (RSRQ) is sufficiently high.

The techniques described herein enable the UE to download the BCCH BlockType1 selectively, only when the likelihood of having missed paging messages is high, rather than indiscriminately whenever paging messages are not received. As a result, the relatively high power consumption associated with BCCH BlockType1 download is spent only where needed, and the overall UE power consumption is reduced.

FIG. 1 is a block diagram that schematically illustrates a wireless network 100, in accordance with an embodiment of the present disclosure. A UE 104 communicates with a base station (eNB) 108. The base station 108 connects the UE 104 to the rest of wireless network 100, which in this example embodiment comprises a LTE network 112. The messages that UE 104 and eNB 108 exchange are illustrated by a bidirectional arrow 116 and are detailed below. Although the figure only shows a single UE and a single eNB, for the sake of clarity, real-life networks typically comprise multiple UEs and multiple eNBs. Only the UE modules that relate to the disclosed techniques are depicted in the present disclosure. In particular, UE 104 comprises a change detection module 120, which is the functional module that is responsible for updating the UE with the operating parameters that are applicable in the cell where the UE is located.

In the embodiments described herein, wireless network 100 comprises a $3^{rd}$ Generation Partnership Project LTE cellular network. In alternative embodiments, however, network 100 may comprise any other suitable type of wireless network that operate in accordance with any suitable cellular standard or protocol.

Figure 2:
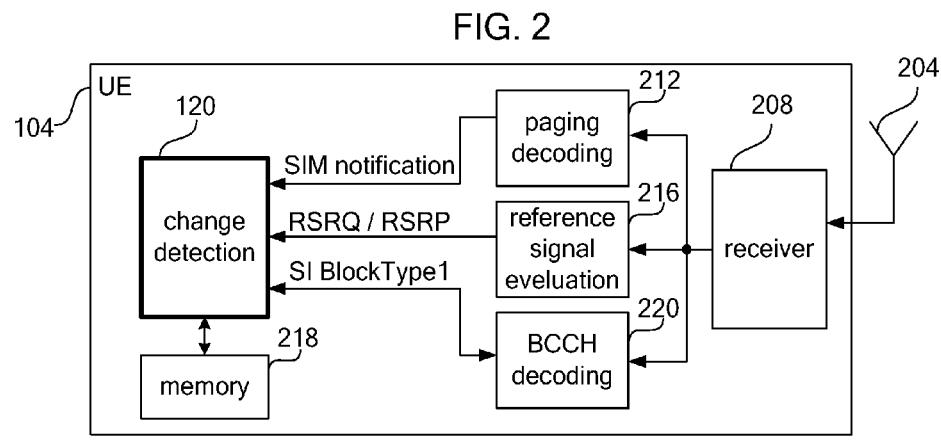
FIG. 2 is a block diagram that schematically illustrates a User Equipment, in accordance with an embodiment of the present disclosure.

FIG. 2 is a block diagram that schematically illustrates UE 104, in accordance with an embodiment of the present disclosure. Only the modules that relate to the disclosed techniques are depicted in the figure, for the sake of clarity. An antenna 204 serves to receive the wireless signals that eNB 108 transmits in the cell in which UE 104 is located. A receiver 208 detects and suitably amplifies the received signals and adapts them for further processing in the subsequent stages.

In an embodiment, a paging decoding module 212 decodes paging messages that are broadcast by eNB 108, e.g., for SI change estimation. At least some messages are SIM notifications which, in an embodiment, are included in some of the paging messages. When the eNB transmits SIM notifications in the paging messages, module 212 extracts the SIM notifications and extracts digital flags that are indicative of the SIM notifications, for processing in the subsequent processing stage. In some embodiments module 212 produces an integrated flag per MP, which indicates whether the eNB has included SIM notifications in the paging messages that it has broadcast in the most recent MP.

A reference signal evaluation module 216 estimates the quality at which the eNB transmission is received by UE 104. Module 216 achieves this estimation by constantly measuring the quality and the power level at which UE 104 receives a reference signal that eNB 108 broadcasts. In an embodiment, module 216 outputs the estimation result, denoted by RSRQ/RSRP, as a digital value that is indicative of a predefined weighting of the quality and power level at which receiver 208 receives the reference signal.

A change detection module 120 estimates, at the end of each MP, a likelihood that the UE has missed all the paging messages during the MP in spite of being within coverage conditions. Module 120 bases the estimation on the SIM notification and the RSRQ/RSRP signals that it receives from modules 212 and 216 respectively, as illustrated below in FIGS. 4A and 4B.

In response to finding that the estimated likelihood exceeds a predefined likelihood threshold, in an embodiment, Module 120 then ascertains whether at least one parameter of operation of the base station is different from the parameters that UE 104 currently holds. In an embodiment, module 120 carries out the ascertaining process as follows: Module 120 instructs a BCCH decoding module 220 to decode the BCCH that UE 104 receives from eNB 108. This decoding also comprises lock on the MP. Module 220 responds by providing module 120 with the SI block that includes the current VT, which is the above explained BlockType1. Module 120 then extracts from the BlockType1 the current VT and compares it with the stored VT. Upon detecting a mismatch between the two VTs, Change detection module 120 will initiate extraction of additional SI blocks from the BCCH. A memory 218 typically holds the SI that the UE currently holds. Upon downloading an updated SI, the Change detection module stores it in memory 218. In alternative embodiments, module 120 may ascertain whether at least one eNB parameter of operation has changed using any other suitable technique and/or message other than the paging messages.

The configuration of UE 104 shown in FIG. 2 is an example configuration, which is chosen purely for the sake of conceptual clarity. In alternative embodiments, any other suitable UE configuration can also be used for realizing the disclosed functionality. In some embodiments, some or all of the UE elements, e.g., blocks 212, 216, 220 and 120 are implemented in programmable hardware modules, such as using one or more Field-Programmable Gate Arrays (FPGAs) or Application-Specific Integrated Circuits (ASICs). Alternatively, some or all of the UE elements are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 3:
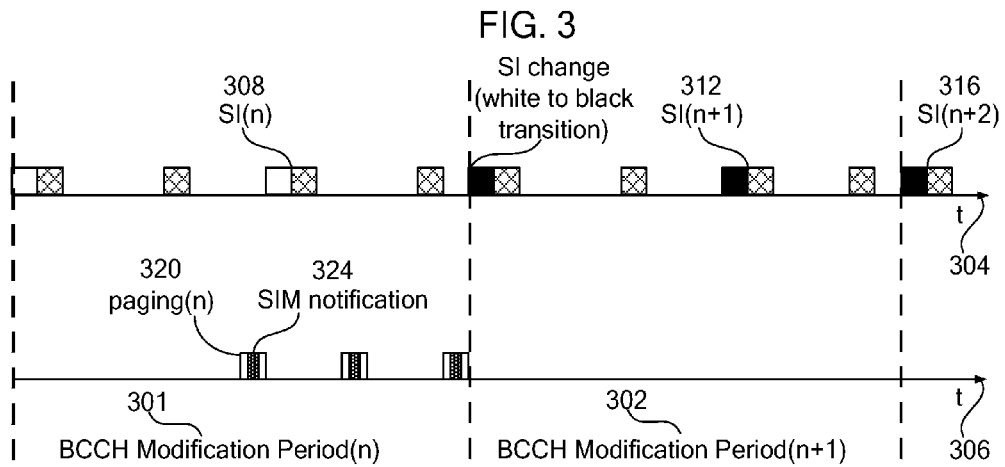
FIG. 3 is a timing diagram that schematically illustrates System Modification information elements, in accordance with an embodiment of the present disclosure.

FIG. 3 is a timing diagram that schematically illustrates information elements that are transmitted by eNB 108 and are related to System Information change, in accordance with an embodiment of the present disclosure. Time axes 304 and 306 are divided to Modification Periods (MPs), as explained above. MP "n" is denoted as MP(n) 301, MP "n+1" is denoted as MP(n+1) 302 and so on. The upper part of the diagram, along time axis 304, depicts sample SI blocks, which are denoted as SI(n) 308 in MP(n), SI(n+1) 312 in MP(n+2) and SI(n+2) 316 in MP(n+2). The white and black areas within these blocks depict SI BlockType1 blocks, wherein the change from white blocks to black blocks (between corresponding SI blocks in MPs 301 and 302) depicts a SI parameters change that occurs at the beginning of MP(n+1).

The lower part of FIG. 3, along time axis 306, depicts paging messages in MP(n), denoted as Paging(n) 320. Each paging message comprises a SIM notification 324. The three SIM notifications indicate an approaching SI change in the next MP, which is MP(n+1) 302.

FIG. 4A is a flow chart that schematically illustrates a method for detecting System Information change, in accordance with an embodiment of the present disclosure. The method begins with a verification operation 404, wherein change detection module 120 verifies, according to a predefined minimal level of RSRQ/RSRP, if UE 104 is in acceptable coverage conditions. In other words, module 120 identifies reception of eNB 108. In alternative embodiments, Receiver 208 evaluates the coverage conditions and provides the change detection module with a respective indication. If the UE is not in acceptable coverage conditions then, at a waiting operation 408, module 120 waits for acceptable coverage conditions.

Upon acquiring acceptable coverage conditions at waiting operation 408, the method proceeds to a decoding operation 412, because SI needs to be acquired whenever UE reenters coverage. Change detection module 120 decodes SI BlockType1, extracts the Value Tag (VT) that is included in the SI BlockType1, and upon detecting a new VT value, acquires additional SI blocks from BCCH decoding module 220.

Upon verifying that the UE is in a coverage region at operation 404, the method proceeds to a listening operation 416, wherein the Change detection module attempts to listen to paging messages, while in coverage conditions, during a complete MP. If a temporary drop in eNB 108 reception occurs while listening, the method resumes operation 408. If listening during a complete MP in coverage conditions is achieved, the method proceeds to a count operation 420, wherein the Change detection module counts, at the end of the MP, how many paging messages the UE has successfully received during the MP. The paging message count is based on counting the number of SIM notifications that module 120 receives from module 212, since during the MP that precedes a SI modification, the eNB comprises a SIM notification in all the paging messages that it broadcasts. If the number, denoted "P", is higher than 0, a check operation 424 follows. If P equals 0, a MPC evaluation operation 428 follows.

An optional operation 424 is applied in embodiments wherein the base station comprises the SIM, including the VT, in the paging messages also in MPs that do not precede SI modification. If the Change detection module detects a new VT value in the SIM it proceeds to operation 412. If no modification is detected then start operation 404 resumes.

In alternative embodiments that do not apply optional operation 424, operation 412 follows operation 420 if P>0 (not shown in the figures). At operation 428, which follows operation 420 if P=0, the Change detection module compares the MPC with a predefined Modification_threshold. If the MPC is higher than the threshold, the Change detection module proceeds to the initial operation 404, due to estimating a sufficiently low likelihood of missed paging messages during the last MP.

In case of a low MPC, a RSRQ/RSRP evaluation operation follows, wherein the Change detection module compares the RSRQ/RSRP level that it receives from the Reference signal evaluation module, with a Reference Signal threshold RS_threshold. A high RSRQ/RSRP level leads to the initial operation 404, due to an estimated sufficiently low likelihood of missed paging messages during the last MP. A low RSRQ/RSRP level leads the Change detection module to estimate that the likelihood of missed paging messages during the last MP is not sufficiently low, thus decoding operation 412 follows. At decoding operation 412, Change detection module 120 decodes SI BlockType1, extracts the VT that is included in the SI BlockType1, and upon detecting a new VT value, acquires additional SI blocks from BCCH decoding module 220. Next to operation 412, the method resumes the initial operation 404.

FIG. 4B is a flow chart that schematically illustrates a method for detecting a SI change, in accordance with an alternative embodiment of the present disclosure. This flowchart differs from that of FIG. 4A in the method of estimating the likelihood of paging loss. In embodiments that adopt FIG. 4B method, MPC>Modification_threshold at MPC evaluation operation 478, does not lead to the estimation of sufficiently low likelihood of paging loss. Instead, a high MPC at operation 478 leads to operation 482, wherein, only if also RSRQ/RSRP level>RS_threshold, then decoding operation 462 is avoided and the initial operation 454 resumes.

The flowcharts shown in FIGS. 4A and 4B are example flowcharts, which are chosen purely for the sake of conceptual clarity. In alternative embodiments, any other suitable flowcharts can also be used for realizing the disclosed methods.

Although the embodiments described herein mainly address user equipment in cellular networks, the methods and systems exemplified by these embodiments can also be used in other applications.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   attempting to receive at a mobile communication terminal paging messages, which are transmitted from a base station;
   in response to detecting in the terminal that a group comprising one or more of the paging messages was missed, assessing whether the base station did not transmit the group, or whether the base station transmitted the group but the terminal failed to receive the group; and
   in response to assessing that the base station transmitted the group but the terminal failed to receive the group, ascertaining at the terminal whether at least one parameter of operation of the base station has changed, by decoding at least part of a downlink message, other than the paging messages, that is transmitted by the base station.

2. The method according to claim 1, wherein decoding the downlink message comprises extracting from the downlink message System Information (SI) comprising the parameter of operation.

3. The method according to claim 1, wherein attempting to receive the paging messages comprises attempting to extract from the paging messages respective indications that indicate whether the parameter of operation has changed.

4. The method according to claim 1, comprising, when the downlink message indicates that the parameter of operation has changed, extracting an updated value of the parameter of operation from the downlink message.

5. The method according to claim 1, wherein changes in the parameter of operation are permitted at boundaries of predefined modification periods such that the parameter of operation is constant during each of the modification periods, and wherein assessing whether the base station did not transmit the group or whether the terminal failed to receive the group comprises evaluating a criterion that depends on a preconfigured number of the paging messages that are transmitted in each of the modification periods.

6. The method according to claim 1, comprising refraining from assessing whether the base station did not transmit the group or whether the terminal failed to receive the group upon evaluating a criterion that depends on a number of previous paging messages that were received successfully.

7. The method according to claim 1, wherein assessing whether the base station did not transmit the group or whether the terminal failed to receive the group comprises estimating a measure of quality at which transmissions of the base station are received at the mobile communication terminal, and assessing whether the base station did not transmit the group or whether the terminal failed to receive the group based on the measure of quality.

8. The method according to claim 1, wherein attempting to receive the paging messages and decoding the downlink message comprise receiving Long Term Evolution (LTE) signals from the base station.

9. Apparatus, comprising:
   a receiver, which is configured to receive signals from a base station;
   a paging decoding module, which is configured to attempt to decode, using the received signals, paging messages that are transmitted from the base station; and
   a change detection module, which is configured to assess, in response to detecting that a group comprising one or more of the paging messages was missed, whether the base station did not transmit the group or whether the base station transmitted the group but the apparatus failed to receive the group, and, in response to assessing that the base station transmitted the group but the apparatus failed to receive the group, to ascertain whether at least one parameter of operation of the base station has changed, by decoding at least part of a downlink message, other than the paging messages, that is transmitted by the base station.

10. The apparatus according to claim 9, wherein the change detection module is configured to extract from the downlink message System Information (SI) comprising the parameter of operation.

11. The apparatus according to claim 9, wherein the paging decoding module is configured to attempt to extract from the decoded paging messages respective indications that indicate whether the parameter of operation has changed.

12. The apparatus according to claim 9, wherein the change detection module is configured to extract an updated value of the parameter of operation from the downlink message when the downlink message indicates that the at least one parameter of operation of the base station has changed.

13. The apparatus according to claim 9, wherein changes in the parameter of operation are permitted at boundaries of predefined modification periods such that the parameter of operation is constant during each of the modification periods, and wherein the change detection module is configured to assess whether the base station did not transmit the group or whether the base station transmitted the group but the apparatus failed to receive the group, by evaluating a criterion that depends on a preconfigured number of the paging messages that are transmitted in each of the modification periods.

14. The apparatus according to claim 9, wherein the change detection module is configured to refrain from assessing whether the base station did not transmit the group or whether the base station transmitted the group but the apparatus failed to receive the group upon evaluating a criterion that depends on a number of previous paging messages that were received successfully.

15. The apparatus according to claim 9, wherein the change detection module is configured to estimate a measure of quality at which transmissions of the base station are received at the mobile communication terminal, and to assess whether the base station did not transmit the group or whether the base station transmitted the group but the apparatus failed to receive the group based on the measure of quality.

16. The apparatus according to claim 9, wherein the receiver is configured to receive from the base station Long Term Evolution (LTE) signals that include the paging messages and the downlink message.

17. The apparatus according to claim 9, wherein the paging decoding module and the change detection module are comprised in a single processor.

18. The apparatus according to claim 9, comprising a mobile communication terminal containing the receiver, the paging decoding module and the change detection module.

19. The apparatus according to claim 9, comprising a chipset for processing signals in a mobile communication terminal, containing the receiver, the paging decoding module and the change detection module.

* * * * *